United States Patent [19]

Diatschenko et al.

[11] Patent Number: 5,415,048
[45] Date of Patent: May 16, 1995

[54] ACOUSTIC GAS-LIQUID FLOW METER

[75] Inventors: Victor Diatschenko, Houston; Anna N. Ledoux, Sugar Land; Winthrop K. Brown, Bellaire; James R. Stoy, Missouri City, all of Tex.

[73] Assignee: Texaco Inc., White Plains, N.Y.

[21] Appl. No.: 266,068

[22] Filed: Jun. 27, 1994

[51] Int. Cl.⁶ .............................................. G01F 1/74
[52] U.S. Cl. .................................................... 73/861.04
[58] Field of Search ............... 73/19.01, 19.03, 24.04, 73/24.01, 861.04, 861.18

[56] References Cited

U.S. PATENT DOCUMENTS

| | | | |
|---|---|---|---|
| 4,543,817 | 10/1985 | Sugiyama | 73/861.18 X |
| 4,824,016 | 4/1989 | Cody et al. | 73/861.18 X |
| 5,148,405 | 9/1992 | Belchamber et al. | 73/861.18 |
| 5,207,107 | 5/1993 | Wolf et al. | 73/861.04 |
| 5,343,760 | 9/1994 | Sulton et al. | 73/861.04 |

FOREIGN PATENT DOCUMENTS

| | | | |
|---|---|---|---|
| 0078214 | 6/1980 | Japan | 73/861.18 |
| 2148003 | 5/1985 | United Kingdom | 73/861.18 |

Primary Examiner—Herbert Goldstein
Attorney, Agent, or Firm—James L. Bailey; Kenneth R. Priem; William J. Beard

[57] ABSTRACT

A multi-phase fluid flow meter based on passive and non-intrusive acoustics is described for use in field applications on pipes. The present design uses the pipe's characteristic acoustic frequency and its amplitude variation in conjunction with a differential pressure measurement to obtain the total mass flow rates and mass flow rates of each phase. In addition to the mass flow rates the void/liquid fraction, fluid velocities and densities become viable estimates. Instrument construction is simple and very robust, allowing for use in extreme environments. This includes down hole as well as surface measurements.

3 Claims, 2 Drawing Sheets

ACOUSTIC GAS-LIQUID FLOW METER

BACKGROUND OF THE INVENTION

1. The Field Of the Invention

The present invention pertains to a method and apparatus to determine the flow regime within a pipe using passive acoustic techniques.

2. The Prior Art

The ideal multi-phase flow meter would determine composition of flowing fluids and the flow rates of each phase, without impeding the flow and/or reacting with the fluids contained within a pipe. This meter would be capable of use in extreme temperatures, pressures and hostile chemical environments while providing accurate results. The construction of this meter would be such that it would be simple and suitable for field applications as well as usage in the laboratory.

Historically, there are devices that perform some of these measurements and a few can operate in environments approaching extreme hostility. For example, nuclear densitometer techniques (see U.S. Pat. No. 4,683,759) are a reliable and robust means of obtaining an average fluid density in pipes containing flowing fluids. Since the instrument is externally mounted on the pipe, it would not interfere with or react with the flowing fluids. Instrument construction typically allows for usage in hostile conditions. The shortcomings of this approach to fluid characterizations are: the statistical nature of the measurements; the necessity of long lived and often high energy radioactive sources; and potential interpretational difficulties when the pipe under investigation contains gases, liquids and fluctuations in chemical composition.

An additional example of the prior art and applications to fluid characterization involves the use of ultrasonic techniques. These types of measurement systems can be intrusive or non-intrusive, depending on the application. Composition of two-phase fluids can be investigated using an intrusive transit time method, as described in U.S. Pat. No. 5,115,670. This method contemplates the measurement of the transit time of a sound wave between an ultrasonic source and a detector located diagonally across a pipe. In principle this transit time can be used to calculate the speed of sound in two-phase flow. This allows the calculation of the mixture's linear velocity and composition. These quantities allow the calculation of mass flow rates or the energy flow rates. The calculated results and their accuracy, for example steam quality, may depend on separate fluid property correlations. The fluid's chemical composition may effect the sensor's longevity.

Fluid velocities can be obtained using Doppler flow meters (see U.S. Pat. No. 5,115,670). These ultrasonic devices can be non-intrusive (externally mounted in the pipe) and protected from the environment. The idea behind these devices is that an ultrasonic signal is continuously transmitted into a pipe containing fluids where scattering occurs from suspended solids, air bubbles, discontinuities or disturbances in the flowing stream. The scattered signal is detected and its frequency is compared to the transmitted frequency. The difference in these frequencies is proportional to the fluid's velocity. These measurements are considered most accurate when evaluating fluids with Newtonian flow profiles and containing suspended particles or air bubbles.

Generally, the designs of existing flow measurement systems using nuclear, acoustic or electromagnetic methods only address a few of the idealized capabilities and concentrate on measuring a restricted set of parameters while actively probing the medium of interest. These measurement systems can be intrusive or non-intrusive and some may require a side stream sample to obtain the required data. Examples of some of the active acoustic flow measurement systems can be found in U.S. Pat. Nos. 4,080,837; 4,236,406; and 4,391,149.

Passive types of measurement techniques in pipes, specifically simple detection of acoustic emissions or "listening," are available, but are limited in scope and applications. For instance, acoustic emissions can be used to detect: slug flow and the presence of sand in multi-phase pipelines (see U.S. Pat. No. 5,148,405); leaks in natural gas pipelines (see U.S. Pat. No. 5,117,676); and steam quality when the acoustic emissions are obtained from a calibrated steam jet produced by an orifice (see U.S. Pat. No. 4,193,290). The use of acoustic emissions as a passive and non-intrusive method in quantitative characterization of multi-phase flow in pipes appears to be novel.

SUMMARY OF THE INVENTION

The present invention estimates the fluid physical properties of fluid flowing within a pipe by measuring existing noise to obtain several physical parameters that traditionally require separate measurements and instrumentation. The present invention is completely passive, non-intrusive and does not use radioactive materials. It can be applied to liquid-liquid systems as well as gas-liquid systems.

BRIEF DESCRIPTION OF THE DRAWING

The present invention will now be described, by way of example, with reference to the accompanying drawings, in which.

DETAILED DESCRIPTION OF THE PREFERRED EMBODIMENT

It is commonly known that multi-phase fluids flowing through a pipe generate noise within the pipe. In principle, this naturally occurring phenomenon should be able to provide information about the fluids flowing in the pipe.

Figure 1:
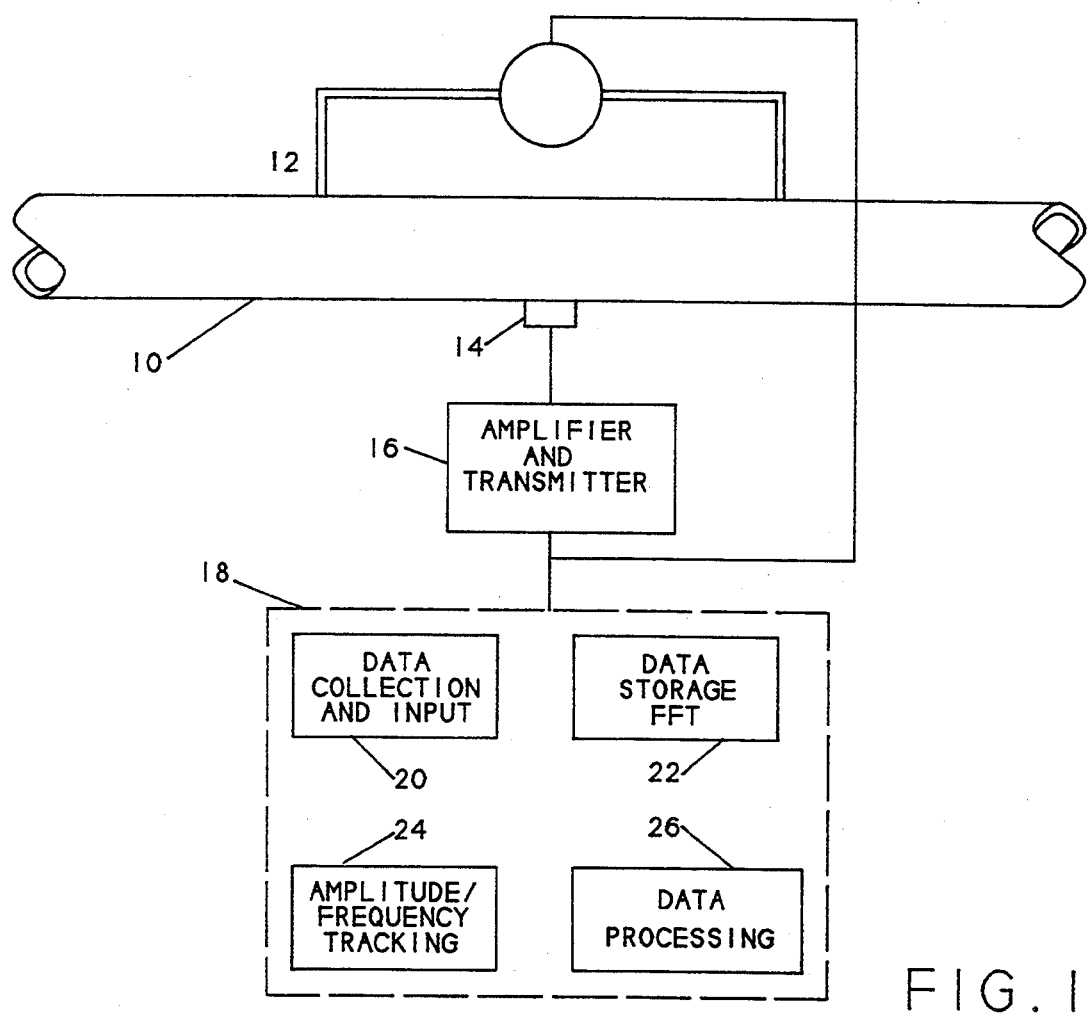
FIG. 1 is a diagrammatic representation of the present invention.

FIG. 1 diagrammatically illustrates an apparatus that has been used to quantitatively characterize a variable mixture of gas and liquid flowing under pressure through a pipe 10. A differential pressure measurement means 12 makes a differential pressure measurement across the point where the acoustic data is to be obtained. An accelerometer 14, or other vibration sensitive sensor, is attached to the pipe 10 at the point where the measurement is desired. The electrical signals from this sensor 14, if necessary, are fed into a pre-amplifier 16 for amplification and transmission to signal processing instrumentation 18. This instrumentation 18 preferably would include: analyzer means 20 capable of performing a Fast Fourier Transform (FFT) on the incoming time domain signals; frequency and amplitude tracking means 22; display means 24 for visual monitoring of the spectra; data storage means 26 and data entry and processing means 28.

Several measurements were performed to identify the relevant parameters required to quantitatively describe the flowing gas-liquid mixtures. These experiments were conducted at low pressures and ambient temperatures using 0.75 inch, and 1 inch in diameter 8 feet in length steel pipes (schedule 40 pipes were used in all cases). Air and water were used as gas-liquid mixtures. The flow rates in these measurements ranged from 0.25 GPM to 4 GPM for water and 3 SCFM to 60 SCFM for air. These values correspond to total mass rates ranging from 2.3 lbm/min to 36 lbm/min.

Figure 2:
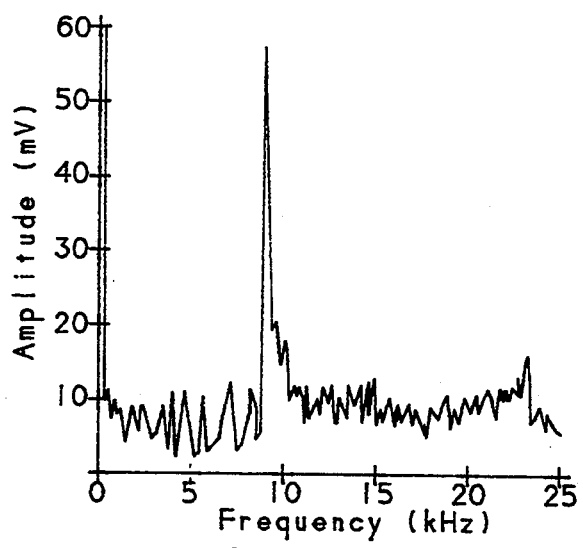
FIG. 2 is a frequency characteristic for one-inch pipe.

The measurements have shown that the identification of the pipe's characteristic vibrational frequency and its amplitude variation are important to quantifying the fluid flow. As an example the acoustic spectrum observed for a 1 inch in diameter pipe that contained a flowing mixture of 4 GPM water and 30 SCFM air, is shown in FIG. 2. While the entire spectrum can be used to identify the flow regime, the same spectra also defines the pipe's characteristic vibrational frequency. That is, the most distinguishable single frequency common to all flow regimes. For the 1 inch diameter pipe, the peak at 8.4 kHz identifies the pipe's characteristic frequency. This high frequency infers that the pipe's vibrations are primarily radial vibrational modes rather than transverse or longitudinal vibrational modes. These measurements also suggested that the characteristic frequency should be strongly dependant on the pipe's internal diameter. This dependance has been measured in pipes ranging from 0.5 inches in diameter to 2 inches in diameter and is shown in FIG. 3.

Figure 3:
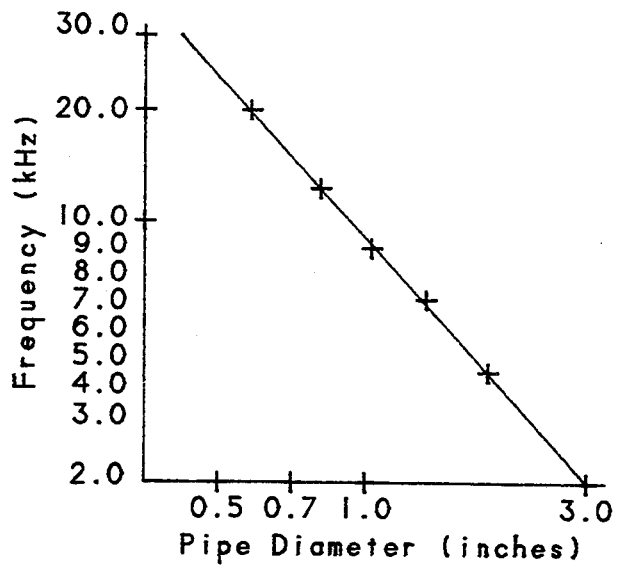
FIG. 3 is a frequency characteristic dependent upon pipe diameter.

Knowing the characteristic frequency of a pipe, either through a spectral measurement or extrapolation from a relationship such as shown in FIG. 3, it is then possible to track the signal amplitude at this frequency while changing the flow rates of the fluids contained in the pipe. This evaluation was performed by establishing a constant liquid flow rate then incrementally increasing the gas flow rate. At the highest obtainable gas rate, the gas rate was reduced to its initial value, then the liquid flow rate was incrementally increased to a new constant value. The gas rate was again incrementally increased to its highest value.

Figure 4:
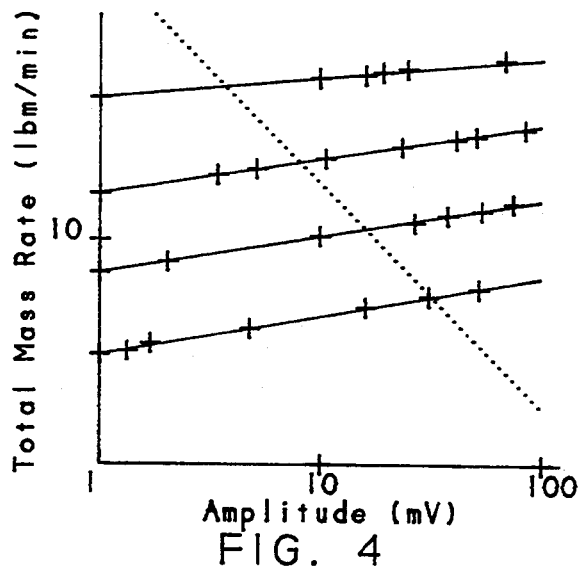
FIG. 4 is a correlation of mass rate, differential pressure and characteristic frequency amplitude.

A small fraction of the data obtained from the 0.75 inch in diameter pipe is illustrated in FIG. 4. Here the volumetric flow rates have been converted to total mass flow rates and displayed as a function of the measured characteristic frequency amplitudes. The data produce a family of curves. The curves shown correspond to initial liquid mass flow rates, starting with the uppermost curve of 33.7 lbm/min, 16.9 lbm/min, 8.7 lbm/min, and 4.4 lbm/min, respectively. The solid curves represent linear curve fits to the data. For a measured characteristic frequency amplitude it is possible to assign several values for the total mass rate. This difficulty is eliminated with the knowledge of the differential pressure or pressure loss measured across the data point by sensor 12. The dashed curve in FIG. 4 represents a differential pressure isobar of approximately 2.2 psi, measured across the 8 feet in length pipe used in the experiments.

Knowledge of the characteristic frequency amplitude and differential pressure uniquely defines the total mass rate and associated curve for further calculations. Extrapolation of this curve to zero signal amplitude defines the liquid mass rate. The difference between the total mass rate and liquid mass rate determines the gas mass rate. The ratio of the gas mass rate to the total mass rate defines the void fraction or alternatively the liquid fraction. Superficial gas and liquid velocities may be calculated from the knowledge of the internal diameter and gas/liquid mass flow rates. Knowing the mass rates of each of the fluids and the void fraction, allows estimates of average fluid velocities and fluid densities. Finally, the results are independent of the flow regime within the pipe during the observation.

The present invention may be subject to many changes and modifications which would occur to one skilled in the art. The present specification is therefor intended in all respects to be illustrative and not restrictive of the scope of the present invention as defined by the appended claims.

We claim:

1. A completely passive and non-intrusive method of determining the mass flow rate within a pipe having two phase fluid flow therein, comprising the steps of:
    providing vibration sensing means in intimate physical contact with the pipe to be measured;
    determining the characteristic vibrational frequency of said pipe;
    creating known data by measuring the amplitude of the characteristic vibrational frequency while varying the mass flow rates of fluids through said pipe;
    measuring the differential pressure in said pipe across two points thereon on either side of the portion thereof contacted by said vibration sensing means; and
    determining the mass flow rate of an unknown fluid flow in said pipe by comparing the characteristic vibrational frequency amplitude from the unknown fluid flow with the known data and said differential pressure measurement.

2. The method according to claim 1 wherein the flow rate of each phase of said two phase flow is varied while creating said known data.

3. A non-invasive passive acoustic system for determining mass flow rate of fluid flowing in two phase flow in a pipe comprising:
    accelerometer vibration sensing means in intimate physical contact with the pipe;
    means for determining the characteristic vibration frequency of said pipe;
    means for measuring changes in amplitude of said characteristic vibrational frequency of said pipe;
    differential pressure sensing means mounted on said pipe and spanning said vibration sensing means and connected to provide an output; and
    means responsive to said differential pressure sensing means output and said amplitude of said characteristic vibrational frequency for determining mass flow characteristics of fluid flow in said pipe.

* * * * *